C. A. BOYD.
TOOL FOR MANIPULATING SPLIT RIMS.
APPLICATION FILED NOV. 5, 1917.
1,263,737.
Patented Apr. 23, 1918.
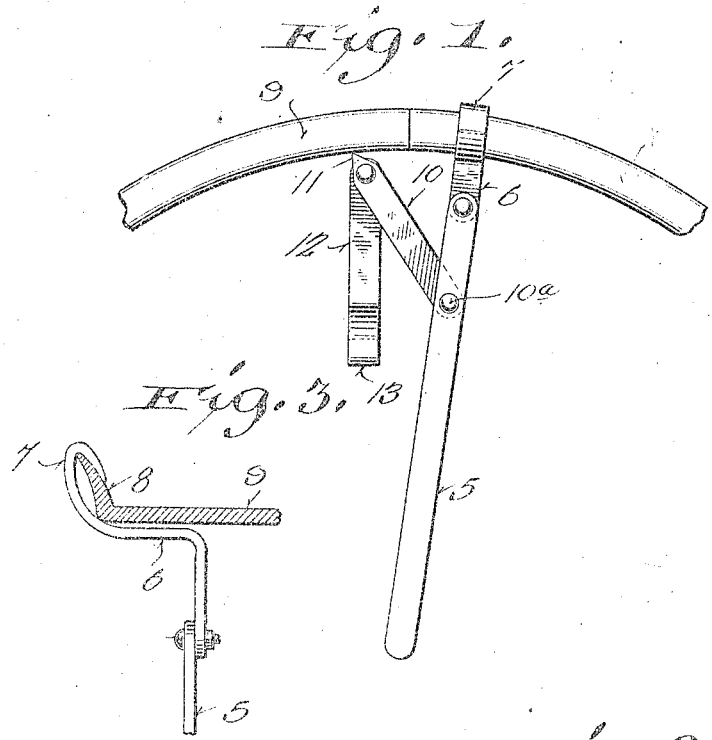
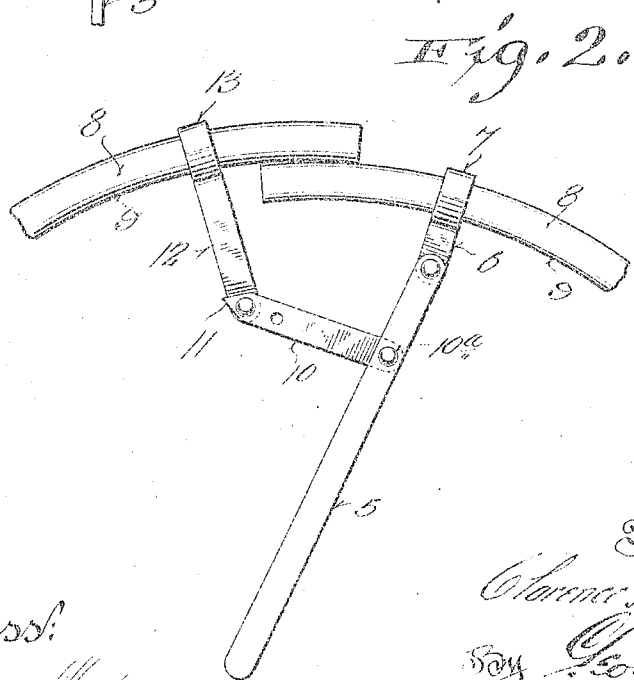

UNITED STATES PATENT OFFICE.

CLARENCE A. BOYD, OF MILWAUKEE, WISCONSIN.

TOOL FOR MANIPULATING SPLIT RIMS.

1,263,737. Specification of Letters Patent. Patented Apr. 23, 1918.

Application filed November 5, 1917. Serial No. 200,397.

*To all whom it may concern:*

Be it known that I, CLARENCE A. BOYD, a citizen of the United States, and resident of Milwaukee, in the county of Milwaukee and State of Wisconsin, have invented certain new and useful Improvements in Tools for Manipulating Split Rims; and I do hereby declare that the following is a full, clear, and exact description thereof.

My invention relates to new and useful improvements in tools for expanding and contracting split rims, whereby to facilitate their manipulation with respect to tires associated therewith.

It is in general the object of my invention to simplify the structure and improve the efficiency of tools of this character.

It is more specifically my object to provide a tool of this nature which may be most readily manipulated, particularly with respect to its attachment to and detachment from the rim.

With the above and other objects and advantages in view, the invention resides more particularly in the novel combination, formation and arrangement of parts hereinafter described and pointed out in the appended claims.

In the drawings:

Figure 1 is an elevational view of the end portions of a split rim in expanded position, and showing my improved tool associated therewith in its initial position for contracting the rim to procure its detachment from the tire.

Fig. 2 is a side elevational view of the rim ends in partially contracted position, and showing my tool attached thereto for completing the contracting operation.

Fig. 3 is a transverse sectional view through a portion of the rim, showing one of the attaching members of my tool engaged therewith.

Referring now more particularly to the accompanying drawings, my improved tool comprises a preferably straight lever bar 5 to one end of which is pivoted the inner end of a rim gripping member comprising a bar 6 bent to provide angularly disposed portions, the free end of the outermost of which is extended laterally and then inwardly to form a hook portion 7 adapted to engage about one side wall portion 8 of a split rim 9, with its bill extending between the side wall portion 8 and a tire disposed on the rim. Pivoted to the lever 5 inwardly of the rim gripping bar 6 is a link 10 and this link has its free end beveled to provide a fulcrum point 11 and has pivoted thereto immediately inwardly of this fulcrum point the inner end of a second gripping bar 12 also bent angularly, and having its inner portion longer than the inner portion of the gripping bar 6. The outer portion of this gripping bar 12 is provided at its free end with a hook 13 similar to the hook portion 7. The link 10 is of a length slightly greater than the distance between its pivotal connection 10$^a$ and the bend of the gripping bar 6 when the said bar is extended with respect to the lever.

Taking up now the operation of the tool, which is divided into two phases, the tool is first applied as shown in Fig. 1, with the hook 7 of the gripping bar 6 disposed about the wall of one end portion of the rim, and the fulcrum point 11 of the link abuttingly engaged against the other end portion of the rim. A rocking movement of the lever will thus serve to procure relative lateral movement of the end portions of the rim, whereby they assume the position shown in Fig. 2. The tool is then detached from the rim and again applied, with the gripping bars 6 and 12 spread and both having their hooks engaged about wall portions of the ends of the rim. Rocking of the lever in a counter-clockwise direction, as indicated in Fig. 2, will then procure an efficient contracting movement of the rim to permit it to be readily withdrawn from the tire. It is noted that the gripping bars 6 may have a slight rocking action with respect to the rim ends, whereby to exert a frictional lock thereon.

Thus my improved tool may be most readily and quickly manipulated, in contradistinction to those types of rim removing tools necessarily embodying rim gripping members which must be fastened to both sides of the rim by suitable adjusting means. In expanding the rim within a tire, the tool is applied to the rim in the general manner shown in Fig. 2, and the lever 5 rotated in a clockwise direction.

What is claimed is:

1. A tool for manipulating split rims comprising a lever, rim gripping means at one end thereof, a link pivoted to the lever adjacent said end thereof, tire gripping means at the free end of the link, and said link being adapted to abuttingly engage one end of a split rim upon engagement of the rim gripping means of the lever with the other end of the split rim, whereby to serve as a fulcrum for said lever to procure transverse movement of the split rim ends.

2. A tool for manipulating split rims comprising a lever, a link pivoted thereto adjacent one end and beveled to form a fulcrum point at its free end, tire gripping bars pivoted to the free end of the link and the specified end of the lever and each bar including a laterally directed outer portion terminating in a hook portion having its bill adapted to engage the inner face of the side wall of the rim.

In testimony that I claim the foregoing I have hereunto set my hand at Milwaukee, in the county of Milwaukee and State of Wisconsin, in the presence of two witnesses.

CLARENCE A. BOYD.

Witnesses:
FRANK L. RATCLIFFE,
M. E. DOWNEY.